US012392056B2

United States Patent
Pillichshammer et al.

(10) Patent No.: US 12,392,056 B2
(45) Date of Patent: Aug. 19, 2025

(54) COUNTER-FLOW WASHING

(71) Applicant: LENZING AKTIENGESELLSCHAFT, Lenzing (AT)

(72) Inventors: Johann Pillichshammer, Frankenmarkt (AT); Christoph Schrempf, Bad Schallerbach (AT); Andreas Gressenbauer, Schörfling am Attersee (AT); Ernst Reiter, Schörfling (AT); Martin Neunteufel, Lantau Island (CN)

(73) Assignee: Lenzing Aktiengesellschaft, Lenzing (AT)

( * ) Notice: Subject to any disclaimer, the term of this patent is extended or adjusted under 35 U.S.C. 154(b) by 346 days.

(21) Appl. No.: 17/779,916

(22) PCT Filed: Nov. 26, 2020

(86) PCT No.: PCT/EP2020/083490
§ 371 (c)(1),
(2) Date: May 25, 2022

(87) PCT Pub. No.: WO2021/105275
PCT Pub. Date: Jun. 3, 2021

(65) Prior Publication Data
US 2023/0010634 A1  Jan. 12, 2023

(30) Foreign Application Priority Data
Nov. 26, 2019  (EP) .................... 19211398

(51) Int. Cl.
*D01D 10/06* (2006.01)
*D01F 2/00* (2006.01)
(Continued)

(52) U.S. Cl.
CPC ............. *D01D 10/06* (2013.01); *D01F 2/00* (2013.01); *D06B 1/04* (2013.01); *D06B 1/14* (2013.01);
(Continued)

(58) Field of Classification Search
None
See application file for complete search history.

(56) References Cited

U.S. PATENT DOCUMENTS

| 4,014,736 A | 3/1977 | Sexton |
| 4,246,669 A | 1/1981 | Davis |

(Continued)

FOREIGN PATENT DOCUMENTS

| CN | 1320176 A | 10/2001 |
| SU | 1320298 A1 | 6/1987 |

(Continued)

*Primary Examiner* — Rita P Adhlakha
(74) *Attorney, Agent, or Firm* — Venable LLP

(57) ABSTRACT

A process and a system for washing filaments. A filament to be washed and a washing liquid are passed in a countercurrent. The process and the system include two washing stages. In each washing stage the filament is brought into contact with a fresh washing liquid by a washing element in such a way that only an amount of the washing liquid is transferred to the filament, which adheres to the filament itself, for example by adhesion. The washing liquid is then separated from the filament again in each washing stage, and a separated washing liquid is collected in such a way that it is not mixed with the separated washing liquid from other washing stages of the process but is used as the fresh washing liquid in the washing element of a preceding washing stage.

14 Claims, 1 Drawing Sheet

(51) Int. Cl.
  *D06B 1/04*   (2006.01)
  *D06B 1/14*   (2006.01)
  *D06B 9/06*   (2006.01)
  *D06B 15/00*  (2006.01)
  *D06B 15/08*  (2006.01)
  *D06B 15/10*  (2006.01)
  *D06B 21/00*  (2006.01)

(52) U.S. Cl.
  CPC .............. *D06B 9/06* (2013.01); *D06B 21/00* (2013.01); *D06B 15/005* (2013.01); *D06B 15/08* (2013.01); *D06B 15/10* (2013.01); *D06B 2700/36* (2013.01); *D10B 2201/22* (2013.01)

(56) References Cited

U.S. PATENT DOCUMENTS

| | | |
|---|---|---|
| 4,549,415 A | 10/1985 | Justus |
| 5,403,530 A | 4/1995 | Taylor |
| 6,645,409 B2 * | 11/2003 | Feilmair ............... D01D 10/06 |
| | | 264/211.14 |
| 2019/0264356 A1 | 8/2019 | Einzmann et al. |

FOREIGN PATENT DOCUMENTS

| | | |
|---|---|---|
| WO | 92/14871 A1 | 9/1992 |
| WO | 00/18991 A1 | 4/2000 |

* cited by examiner

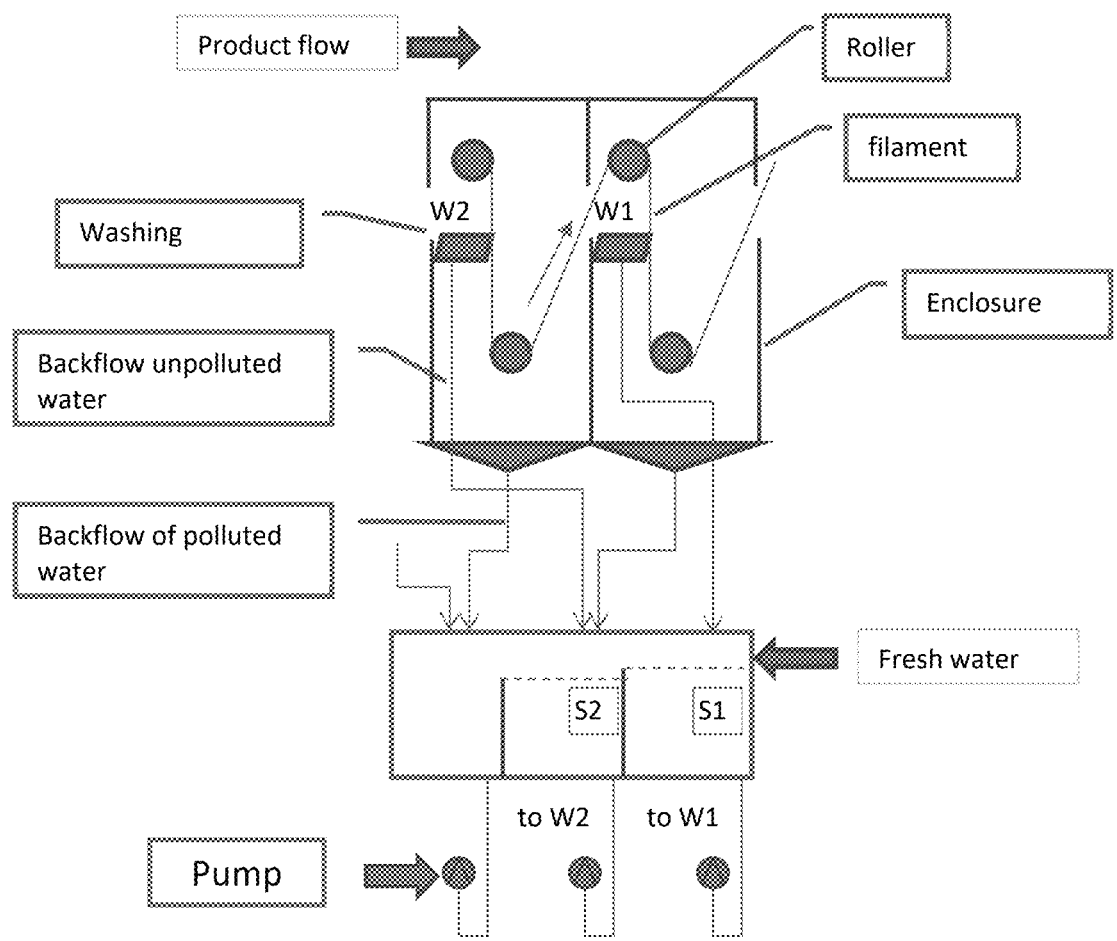

COUNTER-FLOW WASHING

The present application is a national-stage entry under 35 U.S.C. § 371 of International Patent Application No. PCT/EP2020/083490, published as WO 2021/105275 A1, filed Nov. 26, 2020, which claims priority to EP 19211398.3, filed Nov. 26, 2019, the entire disclosure of each of which is hereby incorporated by reference.

BACKGROUND OF THE INVENTION

Field of the Invention

The present invention concerns a process for washing filaments.

Background

Filaments, especially on the basis of cellulose, are produced on a large scale and used in many areas, such as the textile industry but also in technical areas. An example of such filaments are filaments produced by the Lyocell process from a composition of cellulose in a solvent, usually a mixture of water and N-methylmorpholine N-oxide (NMNO). The spinning solution produced from this is spun through nozzles to produce filaments, which are regenerated in an aqueous precipitation bath. The resulting lyocell filaments are so-called regenerated cellulose fibers, which are characterized by a special combination of product properties (such as high dry and wet strength combined with a soft handle and good moisture absorption capacity).

Due to the fact that the individual components of the spinning solution and the precipitation bath solution used in the production of Lyocell filaments can be conducted in closed material cycles, so that a high degree of reuse of the materials used is achieved, the production process of Lyocell filaments is more environmentally friendly, especially in comparison with other regenerated cellulose fibers such as viscose. Furthermore, the solvents used in the process (water, as well as NMNO) as such are already much more environmentally friendly than, for example, the components used in the viscose process.

After precipitation/regeneration of the lyocell filaments, the obtained filaments are fed to further treatment steps. An essential treatment step is the washing of the obtained filaments, whereby especially still adhering solvent (NMNO), but also other components of the spinning solution and/or the precipitation bath are removed.

For such washes there are a number of approaches, such as the classical bath washing (the filament is passed through a bath with washing liquid), the controlled bath washing (a design similar to the classical bath washing), washing by applying washing liquid to the filaments through nozzles or jets, or even more complex processes, such as alternating roller washers (in which the filament is again passed through a bath of washing liquid, whereby between individual washing steps the filament is passed over a deflection roller outside the washing liquid so that, for example, excess liquid can drip off), perforated drum washers or pressure chamber washers.

All these approaches to washing have in common that the filament is either surrounded by a very large amount of washing water or is exposed to a very large amount of water. However, only a small portion of the water comes into direct contact with the filament. At the same time, the accumulation of, for example, the washed-out solvent leads to an accumulation of these components in the washing bath, so that the quality of the laundry decreases as long as no countermeasures are taken. Appropriate countermeasures, such as exchanging the water, again lead to an increase in the amount of water used and thus to a lower environmental impact and higher costs.

Although there is also the approach in such washing processes that the water is collected and circulated and used several times at the same place for washing, this also leads to a reduction in washing performance after a certain time. Again, this can only be compensated by adding new fresh water.

Such washing processes and plants are described in U.S. Pat. No. 4,549,415, for example. Here, a cascade of washing areas is already in use, but they are connected to each other and washing is done by guiding the fibers through the washing bath, which again requires a large amount of washing liquid. WO 00/18991 A1 reveals a process in which a fleece formed from staple fibers is washed. US 2019/264356 A1 also reveals a process in which a fiber fleece is washed. In both of the above-mentioned writings, a large surplus of washing liquid is used, as otherwise no sufficient effect is achieved with the fleeces to be treated.

Since with all these approaches, only a comparatively small portion of the washing water comes into contact with the filament, but especially the washed-out solvent mixes again with the unpolluted or only slightly polluted water, the efficiency of the wash is reduced. This is particularly problematic in view of the ever increasing demands with regard to the careful use of resources. At the same time, particularly in the textile sector, even if small residual amounts of solvent or similar on the filament are neither harmful to health nor problematic in terms of wearing comfort etc., ever higher demands are being made on "freedom from chemicals".

There is therefore a need for filament treatment processes that enable highly efficient and as complete as possible removal on the one hand, and solvents and process chemicals on the other. With regard to the washing of Lyocell filaments, this means in particular a removal of the solvent NMNO from produced Lyocell filaments. At the same time, the amount of washing liquid (water in the case of Lyocell filaments) should be as small as possible.

SUMMARY

This task is solved by the procedure according to claim 1. Preferred forms of execution are given in the subclaims and also in the following description. Furthermore, this task is solved by a system according to claim 9, whereby again preferred embodiments are given in the subclaims and the following description.

BRIEF DESCRIPTION OF THE FIGURE

The FIGURE schematically shows the process of a countercurrent washing or a system for countercurrent washing in accordance with the present invention using two washing stages.

DETAILED DESCRIPTION

The present invention is first described with regard to the process. However, it is clear to the person skilled in the art that the explanations made in this context also apply analogously to the claimed system. The process of the present invention is applicable to a large number of different filaments. Even if the following description, especially with the preferred designs, is aimed at washing lyocell filaments with the washing liquid water, to remove the residual amounts of the solvent NMNO, which still adhere to the filaments, it is obvious to the skilled person that this method can also be used with other types of filaments, using other washing liquids and to remove other components adhering to the filaments.

The process according to the invention is characterized on the one hand by the fact that the filament to be washed and the washing liquid are led in countercurrent. In the FIGURE this is indicated by the opposite directions of the arrows for fresh water (washing liquid) and product flow (filament). This means that uncontaminated washing liquid is fed to the last washing stage, while the filament to be treated is fed to the first washing stage. The FIGURE shows an example of a process with two washing stages, but according to the invention, processes with a significantly higher number of washing stages are preferred. Processes with preferably 2 to 60, especially 10 to 50 and preferably 20 to 40 washing stages have proven to be suitable. The number of washing stages can be selected depending on the result to be achieved (e.g. residual amount of defined substances on the fiber, such as NMNO) and product properties, such as the thread thickness of the filament/filament bundle (greater thread thickness (basically higher values for the diameter of the filament or filament bundle) often require a higher number of washing stages) and/or the production speed (higher speeds also often require a higher number of washing stages).

This process ensures that fresh washing liquid is used in the last washing stage, where the filaments to be treated have only the smallest amount of components to be removed, so that an excellent effect is achieved.

At the same time, the process according to the invention is characterized by the fact that the filament does not have to be passed through a bath of washing liquid or sprayed with a large amount of washing liquid. In order to minimize the amount of washing liquid used in the process according to the invention, the filaments to be washed are acted upon by a washing element (W1, W2) in each washing stage in such a way that only as much liquid is transferred to the filaments as the filaments can absorb and bind. This is completely sufficient for an efficient washing effect, since the relevant mass transfer processes during the washing/washing process only take place in very thin areas directly on the surface of the filaments (e.g., in the case of lyocell filaments, the transfer of the adhering residual amounts of NMNO from the filament into the washing liquid. It has been shown that the targeted use of minimized but optimized amounts of washing liquid is completely sufficient for an efficient treatment—with considerably larger amounts of washing liquid, only the amount of washing liquid used but not the effectiveness of the laundry is increased.

Such a targeted and minimal exposure of the filaments to washing liquid can be achieved, for example, by the washing element (W1, W2) providing a thin, falling film of washing liquid (especially water), past which the filaments to be washed are led in such a way that they can be wetted by the surface of the washing liquid. This enables the transfer of a small but sufficient amount of washing liquid. Other designs of the washing element are, for example, rolls or rollers wetted with washing liquid, in particular slow-running contact rolls, which are known to the expert but are used in a new and inventive way according to the invention (possibly with a suitable surface structure; such as grooves and flutes provided all around or in the axial direction). These rolls and/or rollers can be supplied with washing liquid by means of spray elements, small immersion baths or similar devices. Another possibility to apply the desired small amount of washing liquid to the filament/filament bundle is the use of a preparation yarn guide. Such devices, which are known to the specialist, are designed in such a way that the washing liquid is applied from one side so that a liquid film is created on the other side, past which the filament/filament bundle is guided in such a way that the desired wetting with washing liquid is achieved. Thread guides in combination with a ram jet washer are also suitable. Here, the filament/filament bundle is wetted with washing liquid through a nozzle, which is preferably provided transversely to the transport direction of the filament/filament bundle.

The filaments/filament bundles to be washed are guided past the liquid films provided by the different elements, as described above, so that the desired wetting with washing liquid is achieved, while at the same time minimizing the amount of washing liquid used. The filaments/filament bundles can be guided in any orientation, from vertical, as shown in the FIGURE, to horizontal, as in the case of rolls/rolls.

This ensures that only the absolutely necessary amount of washing liquid is used in each washing stage. The washing liquid used in a given washing stage but not consumed can be reused in the same washing stage, for example by suitable recycling of the washing liquid Each washing stage or at least one group of washing stages is separated from the other washing stages or groups of washing stages, for example by an enclosure, so that in particular there is no mixing of the quantities of washing liquid that were actually used to wash the filaments and therefore have an increased proportion of washed-out components after separation from the filaments. This used washing liquid is removed in a suitable way from the filaments/filament bundles, by centrifugation, the use of scrapers, etc. This ensures in particular that no undesired mixing of the quantities of contaminated washing liquid occurring in a washing stage occurs. In order to enable the best possible utilization of the washing liquid, the process according to the invention is designed in such a way that the contaminated amount of washing liquid produced in one washing stage is fed to the preceding washing stage as washing liquid. If not every washing stage is individually separated from the other washing stages, but only groups of washing stages are separated from each other, it is sufficient according to the invention if at least two different groups of washing stages are present, preferably, as already mentioned above, but considerably more than two groups of washing stages.

With reference to the FIGURE, this can be described as follows. In the last washing stage (right washing stage with washing element W1) fresh water is used as washing liquid. This is led from the storage tank S1 to washing element W1. The filament guided along the washing element W1 takes up a quantity of washing liquid, which is removed from the filament within the washing stage, for example by a deflection roller (but other methods of removing the washing liquid, such as wiping or squeezing methods, can also be used here). Thus, the NMNO content removed by the washing liquid in this stage is separated (when lyocell filaments are washed with water). Although this washing liquid, which is slightly contaminated with NMNO, cannot be used for the last washing stage, the NMNO content is still so low that this liquid can still be used as washing liquid in the previous washing stage with washing element W2.

For this purpose, the quantity of used washing liquid from the last stage is fed to the storage tank S2 from which this washing liquid can then be fed to the washing element W2.

This counter-rotating guidance of filament and washing liquid can be applied to a higher number of washing stages according to the example illustrated here with two washing stages. In each case, the used washing liquid of one stage is fed to the preceding stage as "fresh" washing liquid. Although this increases the proportion of washed-out components, such as NMNO in the wax liquid, the fact that the proportion of these components on the filaments in the preceding washing stages is also higher means that a good washing effect is still achieved in each washing stage.

As already mentioned above, in each washing stage not only is the filaments wetted with washing liquid, but this washing liquid is also separated from the filaments again in each washing stage (whereby the separation between the individual washing stages prevents undesired mixing of the individual washing liquids) This can be done by simple dripping, or by using other measures, such as guiding around a roller for centrifuging the washing liquid or by using scrapers or squeezing devices. This separated used washing liquid is used as fresh washing liquid in the previous washing stage.

If one considers the last washing stage in a washing process for Lyocell filaments, this means that the very slightly contaminated used washing water obtained in this washing stage is fed to the previous washing stage, in which the Lyocell filaments still have a slightly higher proportion of, for example, solvent. Although the water used in this washing stage then also contains a certain amount of solvent (due to the last washing stage), this washing liquid is still sufficiently clean so that a good washing of the filament can take place in the preceding washing stage. For this purpose, the washing water is reintroduced into the washing element of the previous washing stage, where it is again ensured by appropriate guidance of the filaments that only a necessary amount of water comes into contact with the filaments. In this washing stage, which is separated from the neighboring washing stages by its own enclosure, the washing water is again removed from the filaments by suitable measures (roller, wipers, squeezing units), so that used washing water accumulates again in this washing stage, which now has a further increased proportion of NMNO. This washing water can then be returned to the previous washing stage, so that the washing water with a further increased proportion of NMNO can again be brought into contact with the filaments, which also have a higher proportion of NMNO.

The above-described storage tanks for the washing liquids of the different washing stages can be provided in a suitable form. The FIGURE shows a schematic diagram of a storage tank with separate areas for the different washing liquids (S1, S2; which differ essentially only in the proportion of components washed out of the filaments, whereby the content of these washed-out components increases slowly, i.e., is higher in S2 than in S1 etc.), where these are separated by simple separations. Thus, for example, undesirable mixing can be prevented by simply checking the level of the individual segments (S1, S2).

This process design makes it possible to bring the filaments into contact with washing liquid sequentially in countercurrent, whereby the fresh washing liquid comes into contact with the filaments that are only lightly loaded, while the countercurrent flow of the used washing liquid from the respective previous washing stages makes it possible to remove the used washing liquid from the filaments, despite the gradually increasing amounts of washed-out components (such as NMNO) in the washing liquid, good effectiveness is still achieved (since even in the respective washing stages the filaments are still exposed to a larger amount of NMNO, a situation in which, however, washing water contaminated with NMNO still provides efficient washing)

Such a process can significantly reduce the consumption of washing liquid in the laundry, especially in comparison with conventional bath washing. At the same time, the efficiency of the laundry is excellent, so that larger quantities of filament can be washed overall with smaller quantities of washing liquid. It has also been shown that the number of washing stages can also be reduced overall through process management in accordance with the invention. By optionally utilizing the washing liquid and avoiding the use of unnecessarily large quantities of washing liquid, efficiency can be significantly increased unexpectedly.

According to the invention, the washing of lyocell filaments can thus be carried out in such a way that the filaments coming from the production process are fed from the precipitation bath to the individual washing stages, if necessary, after removing adhering liquids. Thus, as shown in the FIGURE, the filament can be fed to the first washing stage, where it is guided by a deflection roller etc. essentially vertically past washing element W2. The filament is guided in such a way that it comes into sufficient contact with the washing liquid to absorb washing liquid. The washing element W2 is designed in such a way that unused washing liquid can be reused in the washing stage by means of suitable retention and circular design. The washing liquid S2 used in this stage is the used washing liquid recovered from the subsequent washing stage. The filament is now passed around a further roll, which serves to remove the washing liquid from the filament in the process shown in the FIGURE. The washing liquid thus separated from the filament and used in this washing stage is collected in a suitable manner and can then be discharged through the line shown at the bottom of the washing stage, either (if there are only two washing stages) for discharge from the system or for use as fresh washing liquid in a previous washing stage (not shown in the FIGURE). If the used wash water is discharged from the washing system, it can either be purified (so that fresh water for the last washing stage is obtained again, in addition to a small amount of washed-out components, which for example are disposed of) or this mixture, which essentially contains only water and NMNO, can be used elsewhere in the filament production process (for example, for the preparation of the spinning solution or in the precipitation bath). In this way an extremely resource-saving overall balance of the washing liquid input can again be achieved. The filament is passed on to the next washing stage, where a washing element W1 again applies washing liquid to the filament. The washing liquid is then separated from the filament again. The quantity of used washing liquid collected and discharged in this stage is used as fresh washing liquid S2 in washing element W2. In washing element W1, the fresh water supplied is used as washing liquid S1.

Tests with Lyocell filaments have shown that the use of a countercurrent washing system according to the invention reduces the residual NMNO content on the filaments by more than 80% with the same number of washing stages, compared to washing stages without separation and countercurrent guidance. At the same time, the countercurrent washing system described here has excellent stability and effectiveness (without production disturbances) even at very high filament/filament bundle speeds (such as 1200 m/min and more). High production capacities can be ensured by a further possible continuous process control.

As already mentioned above, the present invention also provides a system (device) for washing filaments which can be easily combined with existing filament production plants. This system comprises at least two washing stages, each comprising a washing element (W1, W2) which brings the filament into contact with fresh washing liquid in such a way that only the amount of washing liquid that adheres to the filament itself, for example by adhesion, is transferred to the filament, and a separating element, which subsequently separates the washing liquid from the filaments again, the system being designed in such a way that the separated washing liquid (S2) is collected in such a way that it is not mixed with the separated washing liquid of other washing stages of the process but can be used as fresh washing liquid in the washing element (W2) of the preceding washing stage. This is achieved by the fact that each washing stage also includes a collecting tank for the separated washing liquid, whereby this collecting tank is designed, for example by means of pipes, pumps, etc., so that the separated and collected washing liquid can be fed to the washing element of the preceding stage. These collecting tanks and the other equipment (pipes, pumps, etc.) as mentioned above may be designed in a suitable manner. The necessary devices/elements are familiar to the specialist.

For this purpose, the system also includes the necessary pipes for the supply and discharge of the washing liquid and suitable devices for maintaining the supply and discharge of the washing liquid, such as pumps or similar. The scrubbing liquid of each washing stage can be provided in storage chambers, whereby these storage chambers can, for example, be designed as adjacently arranged sections of a large storage tank. In this design, the different storage chambers are separated from each other, for example by partitions. By suitable use of different heights of partitions, a storage tank with a multitude of chambers can be provided in a simple way, which prevents an undesired backmixing of more highly loaded washing liquid with less loaded washing liquid.

The washing elements can be selected in particular from elements for providing a falling film of washing liquid, rollers and/or rolls, which may have a surface texture, preparation yarn guides and a combination of ram jet washers and yarn guides.

The elements for removing the washing liquid from the filaments can be selected in particular from centrifugal elements, squeezing devices and/or scrapers.

The enclosures preferably provided according to invention separate individual washing stages or groups of washing stages from each other. Such enclosures can easily be manufactured from suitable materials, such as steel sheets. The housings are usually designed in such a way that the used washing liquid (i.e., the washing liquid removed from the filaments) collects at the bottom, so that a simple and safe discharge into the storage chamber for the preceding washing stage is possible.

The system also includes the rolls and/or rollers necessary to guide the filaments so that the filaments are passed through the washing system.

What is claimed is:

1. A process for washing a filament, wherein the filament to be washed and a washing liquid are passed in a counter-current, the process comprising at least two washing stages, and in each washing stage the filament is brought into contact with a fresh washing liquid by a washing element in such a way that only an amount of the washing liquid is transferred to the filament, which adheres to the filament itself, and the washing liquid is then separated from the filament again in each washing stage and a separated washing liquid is collected in such a way that it is not mixed with the separated washing liquid from other washing stages of the process but is used as the fresh washing liquid in the washing element of a preceding washing stage, wherein the washing element is selected from elements for providing a falling film of washing liquid, rollers or rolls, preparation yarn guides, and a combination of ram jet washers and yarn guides, the washing element transferring only an amount of the washing liquid to the filament that adheres to the filament.

2. The process according to claim 1, comprising at least five washing stages.

3. The process according to claim 1, wherein separation of the washing liquid from the filament in each washing stage is affected by stripping, squeezing or centrifugal elements.

4. The process according to claim 1, wherein the washing element produces a falling film of the washing liquid.

5. The process according to claim 1, wherein the filament is a lyocell filament and the washing liquid is water.

6. The process according to claim 1, wherein individual washing stages are separated from other washing stages by enclosures.

7. The process according to claim 1, wherein the filament is passed substantially vertically past the washing element.

8. The process according to claim 1, wherein a used washing liquid separated from the process is either purified so that the fresh washing liquid is obtained for a last washing stage or is used as a process liquid in filament production.

9. A system for washing a filament, the system comprising at least two washing stages, and in each washing stage the filament is brought into contact with a fresh washing liquid by a washing element in such a way that only an amount of a washing liquid is transferred to the filament, which adheres to the filament itself, and, in each washing stage, the washing liquid is then separated from the filament again and a separated washing liquid is collected in such a way that it is not mixed with the separated washing liquid from other washing stages of the system but is used as the fresh washing liquid in the washing element of a preceding washing stage, wherein the washing element is selected from elements for providing a falling film of washing liquid, rollers or rolls, preparation yarn guides, and a combination of ram jet washers and yarn guides, the washing element transferring only an amount of the washing liquid to the filament that adheres to the filament.

10. The system according to claim 9, wherein individual washing stages or groups of washing stages are separated from each other by enclosures.

11. The system according to claim 10, each enclosure having an outlet for the washing liquid used in the respective washing stage.

12. The system according to claim 9, wherein separation of the washing liquid from the filament is affected by scrapers, squeezers and/or centrifugal rolls.

13. The system according to claim 9, wherein supply of the washing liquid to the washing element is done by pumping.

14. The system according to claim 9, wherein the washing liquid for each washing stage is provided in storage chambers.

* * * * *